United States Patent

Hull et al.

[11] Patent Number: 5,440,784
[45] Date of Patent: Aug. 15, 1995

[54] ERGONOMIC HAND GRIP

[76] Inventors: Harold L. Hull, 401 Canyon Way #43, Sparks, Nev. 89434; Judith Aston, P.O. Box 3568, Incline Village, Nev. 89450

[21] Appl. No.: 316,876

[22] Filed: Oct. 3, 1994

Related U.S. Application Data

[63] Continuation-in-part of Ser. No. 61,684, May 17, 1993.

[51] Int. Cl.⁶ .............................. A45C 13/26
[52] U.S. Cl. ........................ 16/110 R; 16/124
[58] Field of Search ........... 16/110 R, 124, 125, 16/126; 38/90; 190/115; 30/517, 525; 81/177.1, 177.3, 489

[56] References Cited

U.S. PATENT DOCUMENTS

| | | | |
|---|---|---|---|
| 375,773 | 1/1888 | Rockwell | 81/489 |
| 412,479 | 10/1889 | Davis | 16/110 R |
| 2,390,554 | 12/1945 | Lamb | 16/126 |
| 2,421,339 | 5/1947 | Leger | 16/110 R |
| 2,617,142 | 11/1952 | Cadwell | 16/114 |
| 3,083,366 | 3/1963 | Franges | 16/114 |
| 3,347,292 | 10/1967 | Morgan, Jr. | 30/525 |
| 3,800,361 | 4/1974 | Stauffer | 16/116 |
| 3,868,110 | 2/1975 | Jones | 16/DIG. 12 |
| 4,701,142 | 10/1987 | Merrit | 440/101 |
| 4,885,818 | 12/1989 | Arterbury | 16/111 R |
| 4,890,355 | 1/1990 | Schulten | 16/111 R |
| 5,031,319 | 7/1991 | Althaus | 30/85 |
| 5,046,387 | 9/1991 | Levake | 81/489 |
| 5,046,739 | 9/1991 | Reichou | 273/148 R |

FOREIGN PATENT DOCUMENTS

| | | | |
|---|---|---|---|
| 939816 | 11/1948 | France | 38/90 |
| 1112170 | 3/1956 | France | 16/110 R |
| 73402 | 10/1916 | Switzerland | 16/111 R |

*Primary Examiner*—Lowell A. Larson
*Assistant Examiner*—Donald M. Gurley

[57] ABSTRACT

A generic ergonomic hand grip is disclosed which teaches an optimum ergonomic relationship between the various parts of the human hand including the wrist, thumbs, thumb pads, finger, finger pads, etc., which may be adapted to many different apparatus's such as suitcases, briefcases, luggage, fishing pole handles, gun handles, hammer handles, knives and many others too numerous to mention.

2 Claims, 2 Drawing Sheets

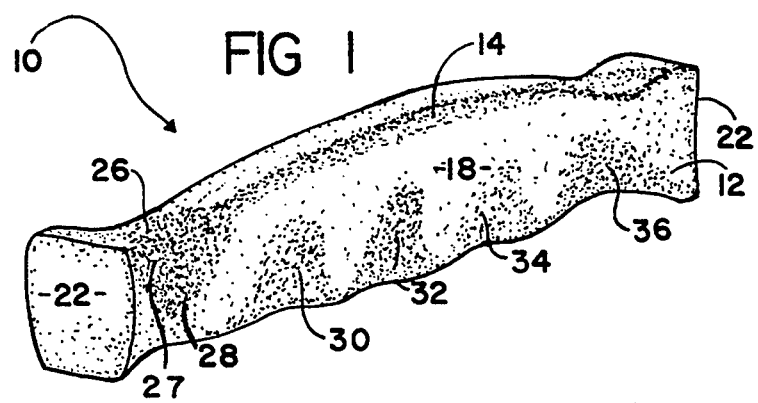
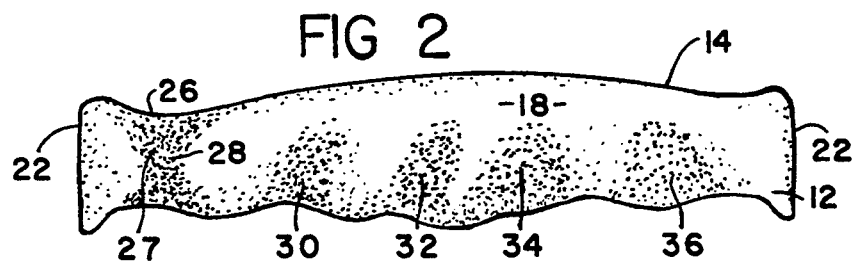
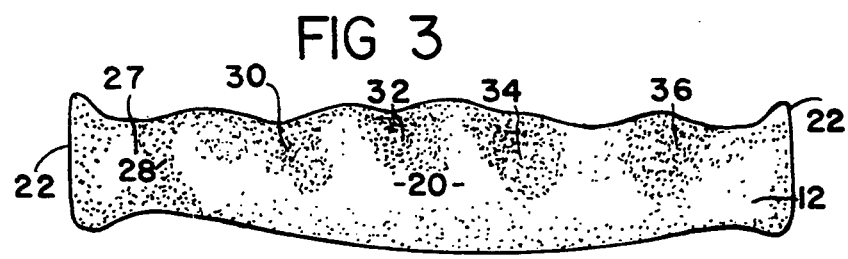
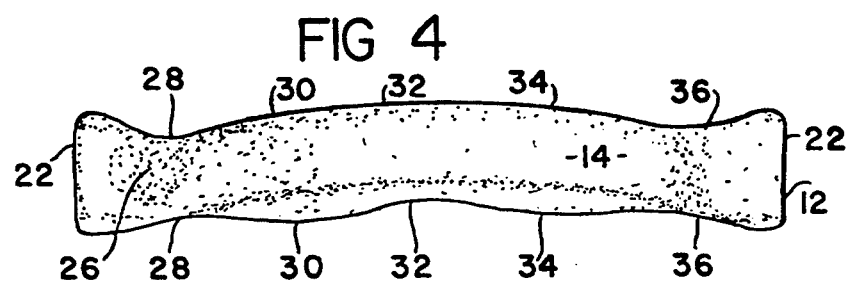
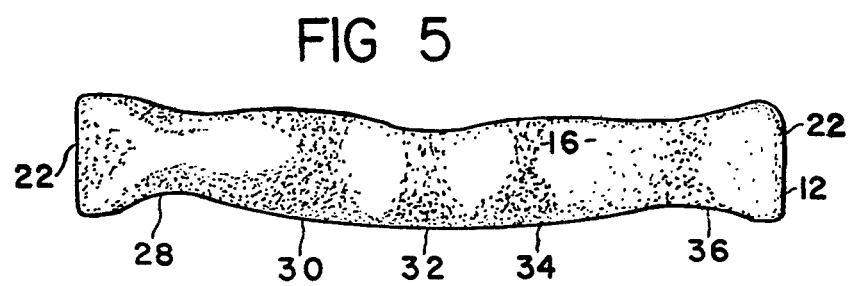

5Th metacarpal

1St metacarpal

Prior art  Right hand

ERGONOMIC HAND GRIP

This is a Continuation In Part of Ser. No. 08/061,684, filed May 17, 1993.

FIELD OF THE INVENTION

This invention relates to hand grips and more particularly to an ergonomic hand grip with emphasis on the relationship between the grip and the human hand.

BACKGROUND OF THE INVENTION

In the past, many hand grips have been utilized in connection with specific apparatus's such as the hand grip of co-pending application Ser. No. 07/937,135, now U.S. Pat. No. 5,265,307, by the same inventors and which discloses an adjustable ergonomic handle which may be adjustable thru several planes and axis to release the strain between the handle and various parts of the hand, wrist, elbow and shoulder.

The U.S. Pat. No. 4,701,142 issued to Merritt discloses a hand grip associated with a paddle, while U.S. Pat. No. 2,617,142 issued to Cadwell teaches a hand grip associated with a camera, U.S. Pat. No. 4,890,355 showing a releasably mountable hand grip for handles which allows the carrier to carry several tote bags, briefcase or the like with one hand grip.

While the above referenced prior art teaches various hand grips applied to various apparatus's the need still exists for a truely ergonomic hand grip that may be adapted to be used with many different apparatus such as suitcases, briefcases, luggage, fishing pole handles, gun handles, hammer handles, knives, etc.

Co-pending design patents by the same inventors, docket numbers 861 and 862, respectively, show decorative designs for a hand grip and this disclosure teaches the utility of such hand grips.

SUMMARY OF THE INVENTION

It is therefor a primary object to provide a hand grip which addresses the ergonomic relationship between the human hand and a handle grip portion of various apparatus's.

It is a further object to provide as comfortable and strain resistant relationship as possible between the various fingers, palm and thumb of the human hand and the grip portion of a handle.

Another very important object is to provide a hand grip which may be used by either the left or right hand of a user.

It is still another object to provide an ergonomic relationship between the gripping portion of the apparatus to be gripped and the various exposed surfaces of the human hand such as finger tips, the ball of the thumb, the sides of the thumb, the sides of the fingers, the palm of the hand, and other flesh portions which cover the skeletal system and upper limb bones of the hand such as the distal, middle and proximal phalanx structures.

It is still another object to improve and distinguish over the prior art the relationship between the grip portion of an apparatus and the knuckles, carpal and metacarpal bones of the human hand.

It is to be noted that the grasp of the human hand, made possible by joint structure, is most effective when the wrist joint is in an extended position thus allowing the midcarpal joints and the radiocarpal joint to permit wrist action. Little movement occurs at the carpo-metacarpal (CM) joints except with the 1st and 5th metacarpals, which can be brought together, making possible cupping of the palm and opposition between the thumb pad and the finger pads. In concert with this action, the 1st metacarpal is rotated inward on the trapezium such that the thumb pad faces the pads of the fingers. This allows one to grasp an object more securely, greatly enhancing the grip power, it is this relationship between the fingers, thumb, proper wrist, lower and upper arms and shoulders, but more specifically, the ergonomic contact between the various parts of the palm, fingers and thumb with an object to be grasped, that this invention addresses.

Briefly stated, the generic functional shape and design of the hand grip of the present invention is adaptable to sumbstantially any object which is grasped by the human hand. The hand grip includes an elongated substantially rigid body having a flowing tracery with a curvilinear exterior configuration conforming and adapted to substantially take the interior shape of a user's hand when the hand is in a gripping position, and more specifically includes a series of alternating curvilinear recesses and ridges conforming to the fingers and spaces between the fingers. Also, a curvilinear section of the grip provides a recess for the ball of the thumb when the thumb is placed substantially in a first position on the upper palm side of the hand grip to provide a better "pushing" position and includes a recess on the finger side of the hand grip to accommodate the inner side of the thumb when in a pulling or lifting second position.

It is to be noted that our new ergonomic hand grip may be adapted to many applications and may be made of a variety of materials as required by the apparatus adapted to, such as wood, plastic, metal, etc.

Other objects and advantages will become apparent when taken into consideration with the following specifications and drawings.

BRIEF DESCRIPTION OF THE DRAWINGS

FIG. 1, is a perspective view of the preferred embodiment.

FIG. 2, is a side view.

FIG. 3, is an opposite side view of the handle of FIG. 2, oriented up-side down.

FIG. 4, is a top view.

FIG. 5, is a bottom view.

DETAILED DESCRIPTION OF THE DRAWINGS

Figure 6:
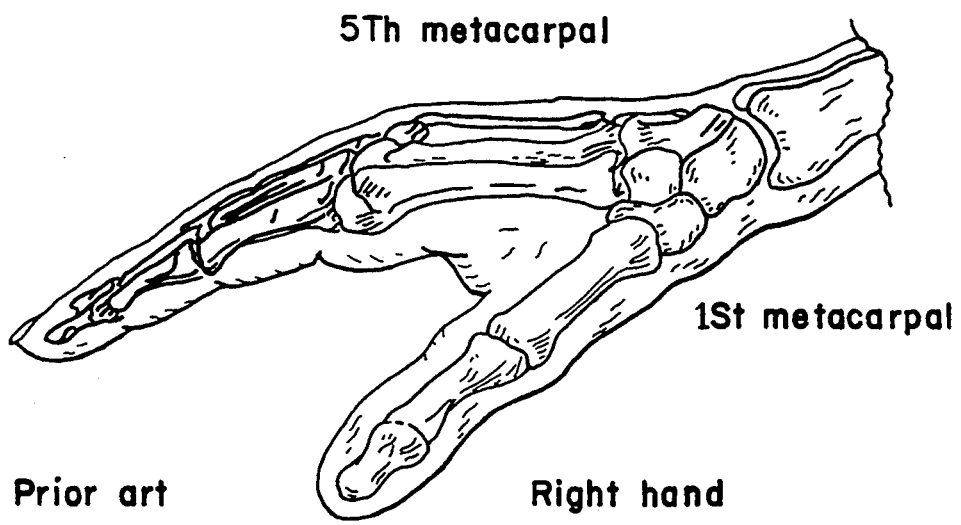
FIG. 6, is a prior art lateral view of the human hand.

Referring now to the drawings wherein like characters refer to like elements throughout the various views, 10 is an overview of the present invention with 12 being a substantially rigid elongated hand grip having a flowing tracery with a curvilinear exterior configuration conforming and adapted to substantially the interior shape of a user's hand when the hand is in a gripping position, and having a top side 14, a bottom side 16, a left side 18, a right side 20, and thumb ends 22. 26 are recessed areas for the ball of the thumb when the hand is in a "pushing" or first position grip, while 27 and 28, respectively, are curvilinear areas for placement of the side of the thumb when the hand is in a "pulling" or second and third lifting position grip, while 30, 32, 34, and 36, respectively are curvilinear areas for the first, second, third and little fingers, respectively, and are used when "pushing" or pulling. It will be noted that the little finger is at substantially a right angle to the plane of the thumb when the thumb is in its first "push" position, while the other fingers assume varying degrees of angles in relation to the plane of the thumb.

It will also be noted that the rigid hand grip 12, is not symmetrical, i.e., the left side 18 is in the form of an inner curve while the right side 20 is in the form of an outside curve to allow the hand grip to be used by the left or right hand of the user.

Figure 7:
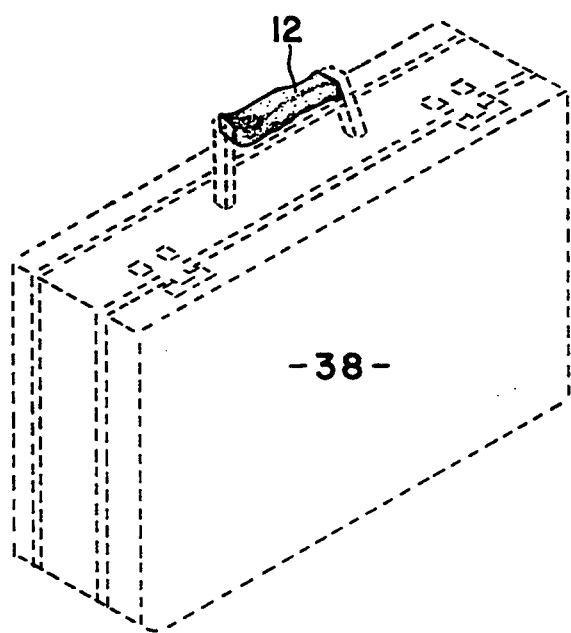
FIG. 7, is an isometric view of a briefcase, shown in phantom lines with the ergonomic hand grip of the present invention shown in full lines that is constructed in accordance with the teachings of the present invention.

FIG. 7 shows a typical application of our new ergonomic hand grip 12 as applied to a briefcase 38, but is not to be limited to this example or embodiment.

The top side 14 is formed substantially in the contour of a semi-circle to more closely match the shape of the palm of the hand of the user especially when used in its first "pushing" position.

It has been noted that different people find it more comfortable to use the handle with the curve portion on the outside rather than on tile inside next to the palm. This is especially true with persons having arthritis of the hands.

It will now be seen that we have disclosed an ergonomic hand grip which may be used with many apparatus's and which provides an ergonomic relationship between the user's hand, finger, thumb, wrist, upper and lower arms, and shoulder and the object to be grasped.

It will also be noted that the grip may be used by the left or fight hand of the user.

It is also to be noted that we have provided a hand grip which may be used in its first position (i.e., with the thumb on the top) to "push" while it also may be used in it's second position (i.e., thumb on the side) to "pull" or "lift" and in its third position located between the first and second position.

Although the invention has been shown and described in what is conceived to be the most practical and preferred embodiment, it is recognized that departures may be made therefrom within the scope and spirit of the invention, which is not to be limited to the details disclosed herein but is to be accorded the full scope of the claims so as to embrace any and all equivalent devices and apparatus's.

Having described our invention, what we claim as new and desire to secure by letters patent is:

1. An ergonomic hand grip comprising; a substantially rigid elongated element forming a handle, said handle having a top, a bottom, a right side, a left side and thumb ends, said element having an ergonomic relationship with a left or right human hand, said human hand having first and second positions, said first position being with a thumb of said left or right human hand being placed on said top of said element at one of said thumb ends and all fingers of said human hand capturing said handle in a hand grip, said second position being with said thumb of said left or right human hand being placed on said left or said right side of said handle element at one of said thumb ends, said fingers capturing said handle in a hand grip, said top having first recessed areas approximately at each of said thumb ends, said recessed areas cooperating with a ball of either thumb of said right or left human hand when said hand is in its said first position, said top being formed substantially in the form of an uprising curve, said uprising curve forming an ergonomic relationship with a palm of said right or said left human hand, second recessed areas formed in said right and said left sides of said handle element approximately at said thumb ends, said second recesses forming an ergonomic relationship with a side of said thumbs of either said left or said right human hand when said human hands are in their said second position, third recessed areas formed in said left side and said bottom of said handle element forming an ergonomic relationship with a first finger of said left or right human hand, forth recessed areas formed in said left and said bottom of said handle element forming an ergonomic relationship with a second finger of said left or right human hand, fifth recessed areas formed in said left, and said bottom of said handle element forming an ergonomic relationship with a third finger of said left or right human hand, sixth recessed areas formed in said left and said bottom of said handle element forming an ergonomic relationship with a little finger of said left or right human hand, said left side being in its length in the form of an inward curve, said right side in its length being in the form of an outward curve and said hand grip having a flowing tracery forming a curvilinear exterior configuration conforming and adapted to take the interior generic shape of said human hands when either hand is in a gripping relationship with said hand grip.

2. The ergonomic hand grip of claim 1 including a third position of said human hand, said third position being with the thumb being placed substantially between said first position and said second position.

* * * * *